Patented Mar. 16, 1954

2,672,465

UNITED STATES PATENT OFFICE 2,672,465

PROCESS FOR THE PRODUCTION OF 3 - ACYLOXY-BISNOR -Δ5- CHOLENIC ACIDS

Heinrich Ruschig, Frankfurt am Main Griesheim, and Hans Georg Fuchs, Frankfurt am Main Zeilsheim, Germany, assignors to Farbwerke Hoechst Aktiengesellschaft vormals Meister Lucius und Brüning, Frankfurt am Main Hochst, Germany, a corporation of Germany No Drawing. Application December 20, 1950, Serial No. 201,858

Claims priority, application Germany January 3, 1950

4 Claims. (Cl. 260—397.1)

The present invention relates to a process for the production of 3-acyloxy-bisnor-$\Delta^5$-cholenic acids.

According to the process described in German patent specification 750,212 3-acyloxy-bisnor-$\Delta^5$-cholenic acids are obtained by subjecting phytoesters, after saturation of the nuclear double bond with bromine, to an ozonization and then splitting up by reduction the ozonides obtained, while simultaneously reestablishing the nuclear double bond. The maximum yields of 3-acetoxy-bisnor-$\Delta^5$-cholenic acids amount to approximately 28%.

Now, we have found that the yields may essentially be increased by performing in a different way both the ozonization of phyto-esters or purified phytosterol derived from soy beans and the cleavage of the respective ozonides. This is done as follows: In an organic solvent, for instance, chloroform, carbon tetrachloride or methylene chloride, in the presence of an organic base, such as pyridine, piperidine or trimethylamine, the nuclear double bond is saturated with a halogen, viz. bromine or chlorine and, after buffering with an organic acid, for instance glacial acetic acid or formic acid, excess ozone, for instance, up to 10 times the necessary theoretical amount, is conducted through the reaction solution. Thereupon, the reaction solution is washed with water and, after evaporating the solvent, an oxidation is carried through with chromic acid followed by a reduction with zinc dust performed in the same organic acid, for instance, glacial acetic acid, propionic acid or formic acid.

It is of advantage to carry through the oxidation at room temperature and subsequently to start the reduction by means of zinc dust. In the course of the latter process the temperature rises very rapidly and comes up to about 90° C. The hydrogen set free in the course of the reduction produces, besides the splitting of the residual ozonides, at the same time the removal of the nuclear halogen. The 3-acyloxy-bisnor-$\Delta^5$-cholenic acids obtained are isolated over the sodium salt according to known methods and then processed.

The process gives yields of approximately 60%, while disregarding the stigmaacetate recovered from the neutral portion.

In view of the importance of the acetoxy-bisnor-cholenic acid as intermediate for the production of hormones, this process is of outstanding value.

The following example serves to illustrate the invention, but it is not intended to limit it thereto:

To a solution of 2.72 kg. of phytosterol acetate with a content of about 14% of stigmasterol acetate (=380 grams of stigmasterol acetate) in 7 liters of dry chloroform and 200 cc. of dry pyridine, there is caused to run in within 30 minutes, while stirring, at a temperature of 10° C.-20° C., a bromo-chloroform solution prepared from 306 cc. of bromine=960 grams in 5 liters of chloroform. Then 300 cc. of glacial acetic acid are added to the reaction solution, the whole is cooled to 0° C. and an ozone stream of 3.3% strength is passed for 16 hours through the cooled solution. The velocity of flow of oxygen amounts to 90 liters and the total amount of ozone is 68 grams (the theoretical amount: 40 grams). The reaction solution is then stirred for 2 hours with 4 liters of water, the chloroform layer is separated, and finally concentrated in the vacuum. The residue is then taken up in 10 liters of glacial acetic acid and, while stirring, a chromic acid solution, prepared from 160 grams of chromic anhydride and 400 cc. of water, is caused to drop within 1 hour into the reaction solution, the temperature not exceeding 20° C.

The reaction solution is then mixed in portions with 700 grams of zinc dust, the temperature rising up to about 80° C. The reduction lasts 30–40 minutes. The whole is poured on ice, taken up with ether and the acetoxy-bisnor-$\Delta^5$-cholenic acid is extracted from the ethereal solution by shaking with sodium hydroxide solution. The acid is finally obtained in a pure state by crystallization from ether and toluene or benzene. The melting point amounts to 234° C.-235° C. The yield of 190 grams corresponds to 58.5% of the theory.

We claim:

1. A process for the production of 3-acyloxy-bisnor-$\Delta^5$-cholenic acids from acylphytosterols derived from soy beans comprising saturating in an organic solvent the nuclear double bond by addition of halogen, in the presence of an organic base, passing excess ozone through the reaction solution after buffering with an organic acid, washing the reaction solution with water and, after evaporation of the organic solvent, both oxidizing with chromic acid and reducing with zinc dust the reaction mixture in the same organic acid.

2. A process for the production of 3-acyloxy-bisnor-$\Delta^5$-cholenic acids from acylphytosterols derived from soy beans comprising saturating in chloroform the nuclear double bond by addition of bromine, in the presence of pyridine, conducting excess ozone through the reaction solution after buffering with glacial acetic acid, washing the reaction solution with water, and, after evaporation of the chloroform, both oxidizing with chromic acid and reducing with zinc dust the reaction mixture in glacial acetic acid.

3. A process for the production of 3-acyloxy-bisnor-$\Delta^5$-cholenic acids from acylphytosterols derived from soy beans comprising saturating in chloroform the nuclear double bond by addition of bromine, in the presence of pyridine, passing excess ozone through the reaction solution after buffering with glacial acetic acid, washing the reaction solution with water and, after evaporation of the chloroform, both oxidizing with chromic acid at room temperature and reducing with zinc dust the reaction mixture in glacial acetic acid.

4. A process for the production of 3-acetoxy-bisnor-$\Delta^5$-cholenic acid from phytosterol acetate derived from soy beans comprising saturating in chloroform the nuclear double bond by addition of bromine, in the presence of pyridine, passing excess ozone through the reaction solution after buffering with glacial acetic acid, washing the reaction solution with water and, after evaporation of the chloroform, both oxidizing with chromic acid at room temperature and reducing with zinc dust the reaction mixture in glacial acetic acid.

HEINRICH RUSCHIG.
HANS GEORG FUCHS.

References Cited in the file of this patent

FOREIGN PATENTS

| Number | Country | Date |
|--------|---------|------|
| 490,756 | Great Britain | Aug. 19, 1938 |